Sept. 29, 1964
C. C. BLAND
3,150,947
METHOD FOR PRODUCTION OF GLASS BEADS
BY DISPERSION OF MOLTEN GLASS
Filed July 13, 1961
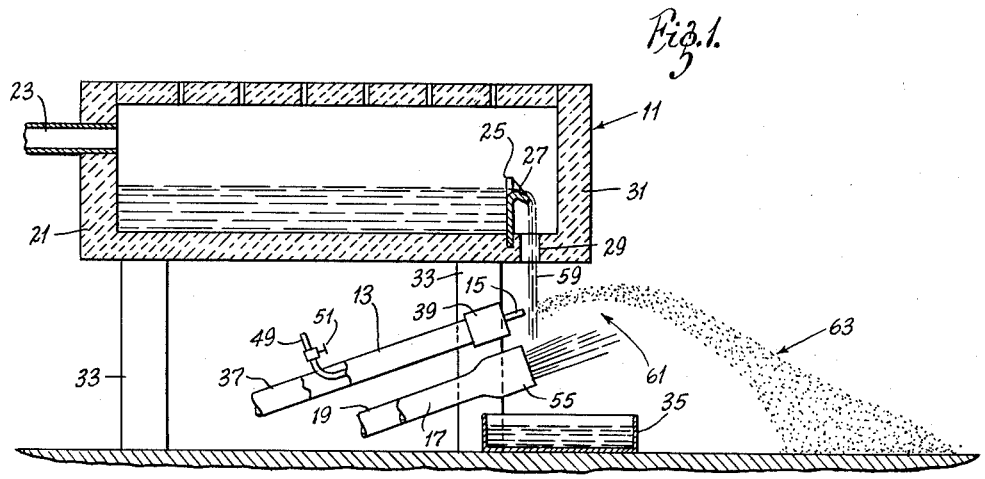
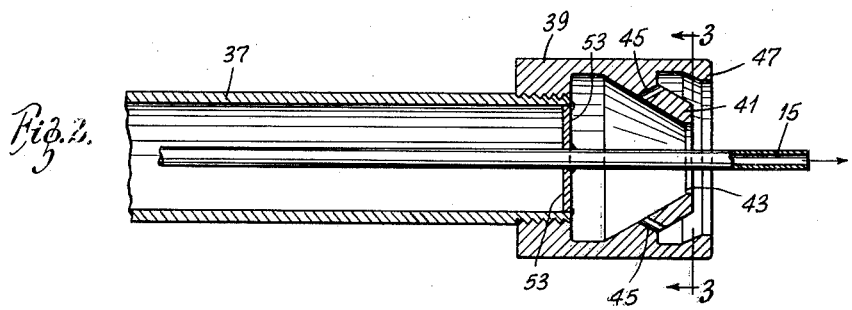
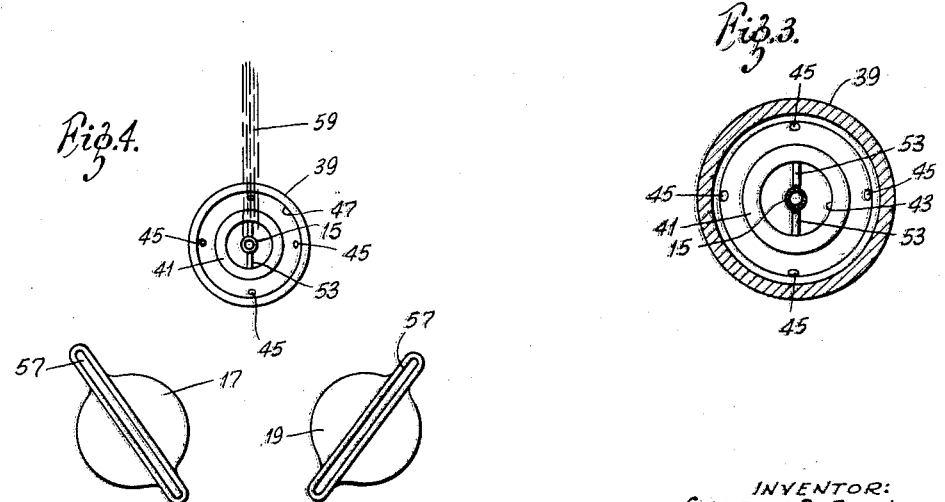
INVENTOR:
CHARLES C. BLAND,
BY Kingsland, Rogers, Ezell & Robbins
ATTORNEYS

United States Patent Office 3,150,947
Patented Sept. 29, 1964

3,150,947
METHOD FOR PRODUCTION OF GLASS BEADS BY DISPERSION OF MOLTEN GLASS
Charles C. Bland, St. Louis County, Mo., assignor to Flex-O-Lite Manufacturing Corporation, St. Louis, Mo., a corporation of Missouri
Filed July 13, 1961, Ser. No. 123,804
3 Claims. (Cl. 65—21)

This invention relates to improvements in the production of small glass beads, and, in particular, is concerned with the method for producing such glass beads by dispersing molten glass of low viscosity by the use of compressed fluid completely enclosed by a gas flame. This application is a continuation-in-part of my prior copending application Serial No. 677,651, filed August 12, 1957.

The glass beads of this invention find particular utility as reflective beads used in highway marking paints, roadside signs provided with coatings of paint, enamels, lacquers, asphalts or thin plastic sheetings upon which the beads are embedded and which are adapted to be illuminated at night and for the reflective illumination of other surfaces through reflection from a beam of light directed upon the surface. Such glass beads are of small particle size and for optimum reflective brilliance should be of truly spherical configuration. Additionally, the glass beads of this invention can be used in any application where substantially spherical beads having a particle size ranging from about 5 mesh down to 400 mesh U.S. standard sieves are desired. Such application is of very broad scope and the beads find usage in a large number of fields.

In the past, such glass beads of this small particle size have been conventionally produced in glass furnaces in which ground glass stock is introduced into a furnace in the form of a vertical stack or the like and upwardly directed gas is burned at a high temperature to carry the beads which are formed in a spherical configuration to the top of the furnace. This type of apparatus is well shown in the Charles C. Bland Patent No. 2,600,963, issued June 17, 1952, and assigned to applicant's assignee. Such apparatus is very effective in producing glass beads of a desired configuration, but is rather expensive and demands cumbersome and quite tall equipment. Additionally, the size of glass beads is limited.

By means of the instant invention there has been provided a relatively simple and very effective method in which the glass beads produced can be in a larger particle size than those heretofore produced and in which this particle size may range from relatively large glass beads of about 5 mesh size down to about 400 mesh. The method is adapted to be used in a small space and can be very simply operated by relatively unskilled workmen.

Essentially this invention comprises melting a glass charge to a molten liquid in a glass furnace and then dispensing the molten liquid in the form of a free falling stream while still in a low viscosity. The low viscosity stream is permitted to fall in space by gravity and is then contacted by a high pressure blast of compressed air. It is to be understood, however, that the molten glass stream may be contacted by any desirable high pressure blast of fluid, such as steam, or nitrogen, or other inert gases, under high pressure, and that where the term compressed air is employed this includes other high pressure gases or fluids.

The flowing molten glass in the form of the free falling low viscosity stream is contacted by a confined jet of compressed air and is dispersed into numerous small glass beads. It is a particular feature of this invention that this dispersion by the high pressure blast of compressed air is carried out by enveloping the blast of compressed air in a gas flame extending uniformly around the periphery of the air blast. This uniform enveloping flame tends to maintain the dispersed droplets in molten form until surface tension can shape them into the form of spheres. Additionally, glass fibers, which may tend to be formed, are burned up, so to speak, or are remelted to glass droplets which can then form into spherical glass beads. As another feature of this invention the dispersed droplets projected into a dispersion path by the compressed air blast are suspended in air by a trough-shaped stream directed underneath the dispersion path. This trough-shaped suspension stream may be effected by another high pressure blast of suspending air made possible by two wing tipped discharge nozzles connected to air conduits. The wing tipped nozzles are arranged in V-shaped fashion with respect to one another to form the trough of air used as an air cushion.

The dispersed beads are suspended in air for a period of time so that their dwell in the air space is increased and are then permitted to fall freely upon a collecting surface. During this suspension in space and the free fall the setting of the droplets to spherical beads occurs. The glass beads may then be gathered from the collecting surface and used in the produced form or classified according to their size.

The molten glass is used in relatively low viscosity. In general this viscosity is determined by observation to be in the nature of the viscosity of #10 SAE motor oil at room temperature, or somewhat less, but for the purpose of control this may be in a higher range of about 10 to about 20 SAE motor oil. One such glass bead composition to obtain such low viscosity is shown in the Duval d'Adrian Patent No. 2,980,547, granted April 18, 1961, and assigned to applicant's assignee. As an example, such glass bead composition may consist of about 56% barium oxide, 32% titanium dioxide, and 12% boric oxide by weight. Where the viscosity of the molten stream is relatively low, the beads produced are of a generally smaller particle size, and, conversely, where the viscosity increases the beads produced are larger. As a further means of control the compressed air blast pressure may vary and, in general, the greater the pressure the smaller the glass bead. It should be noted that where the higher viscosities are employed and lower blast pressures, tending to make larger glass beads with attendant problems of creation of tear-shaped beads and fibers, the use of the completely enveloping gas flames surrounding the air blast very significantly minimize this problem and increases the percentage of truly spherical glass beads produced.

Accordingly, it is a primary object of this invention to provide a method for producing glass beads by dispersing molten glass of low viscosity by contact with a high pressure blast of compressed air and completely enveloping the disepersed beads at the point of contact of the stream with the blast of air in a high temperature region.

It is another object of this invention to provide a method of producing glass beads of a small particle size in which the molten glass free falling stream is contacted by a high pressure blast of compressed air completely enveloped by a gas flame.

It is still another object of this invention to provide a method for producing glass beads by dispersing a free falling molten glass stream of relatively low viscosity by contact with a jet of high pressure air and suspending the glass beads by providing a trough-shaped path of compressed air underneath the dispersed beads.

It is still another object of this invention to provide a method for producing glass beads by contacting a free falling molten glass stream of relatively low viscosity with a compressed air blast completely enveloped by a gas flame to disperse the molten glass in a path of glass bead droplets and directing a trough-shaped suspension path of compressed air underneath the droplets to suspend them in space for a period of time to permit setting of the droplets to glass beads.

Still a further object of this invention is to provide a method for producing glass beads of small spherical particle size which is relatively simple and economical and can be employed under limitations of space by relatively unskilled operators.

Further objects of this invention will appear in the detailed description which follows and will be further apparent to those skilled in the art.

For the purpose of illustration there is shown in the accompanying drawings a preferred form of the apparatus used in the method of this invention. It is to be understood that these drawings are for the purpose of example only and that the invention is not limited thereto.

In the drawings:

FIGURE 1 is a view in vertical section through the apparatus employed in the method of this invention;

FIGURE 2 is an enlarged view in axial section of the gas burner nozzle and the compressed air conduit for dispersing the molten glass stream;

FIGURE 3 is a view in section taken on line 3—3 of FIGURE 2 further showing the construction of the gas burner and the compressed air conduit; and FIGURE 4 is a front view of the gas burner and the suspending air conduits showing the V-shaped arrangement of the wing tipped air conduits to provide the suspending air stream.

The main components of the apparatus of employed in the method of this invention are shown in FIGURE 1 and comprise a furnace 11, a gas burner 13, a compressed air conduit as a dispersing means 15 located centrally within the gas burner, and a pair of wing tipped air conduits 17 and 19 arranged to provide a trough-shaped suspending air stream.

The glass furnace 11 is comprised of a ceramic tank 21, which is spaced substantially off the floor. A charging chute 23 is situated at the rear of the furnace and is adapted to charge glass stock or batch thereto. Conventional heating means, such as gas burners or the like, are employed to melt the glass stock or batch to keep the glass in a low viscosity molten state and such heating means will be readily understood, although not shown in this drawing. At the forward end of the glass furnace is provided a weir plate 25, which has a spout 27 to dispense the molten glass in a free falling stream into space through an opening 29. It will be noted that the forward wall of the glass furnace, as designated at 31, provides a substantial space for the molten glass to fall through. As a further consequence of the spacing of the forward wall 31 from the weir plate 25, there is provided a protective heat barrier enclosure so that the liquid falling over the spout of the rear plate through the opening in the bottom of the furnace does not cool substantially, which cooling would tend to increase the viscosity of the free falling stream.

The entire glass furnace 11 is supported a substantial distance off the ground by legs 33. This provides for a fair degree of free fall of the stream of molten glass and the beads which are ultimately dispersed, as will be more clearly understood hereinbelow.

A quench tank 35, which may be filled with water, is situated underneath the furnace opening 29. This quench tank catches any molten glass which is not dispersed and the glass waste collected therein may be recharged to the furnace.

The gas burner 13 is best shown in FIGURES 2 and 3. As there shown it is comprised of a conduit 37, which receives a mixture of gas and air from a convenient source. A burner nozzle 39 is provided at the forward end of the gas and air conduit and is provided with a forwardly tapering mouth portion 41, which has a central opening 43. A series of circumferentially spaced pilot openings 45 are drilled into the mouth portion to provide for the passage of a gas and air mixture to provide a pilot flame for continued ignition of the main burner flame. A protective baffle 47 extends forwardly of the pivot openings and is turned down slightly to direct the air and gas pilot mixture and resultant pilot flame into the main gas and air combustion flame.

The compressed air conduit 15 is also best shown in FIGURES 2 and 3. As there shown it is comprised of a compressed air pipe 49, fitted into the shell of the gas air conduit 37 and provided with an adjustment valve 51 for varying the air pressure. The forward portion of the conduit is supported within the gas air conduit by support rods 53 which may be tack welded to the conduit 15 at one end and to the forward end of the gas air conduit 37 at the other end. The conduit 15 at its forward end is centrally located within the opening 43 of the mouth portion of the burner nozzle and projects a short distance forwardly thereof, as shown in FIGURE 2.

The suspension air conduits 17 and 19 are best shown by referring to FIGURES 1 and 4. As there shown both of these conduits are provided with wing tip distributing discharge nozzles 55 and 57. The major axis of these discharge nozzles are located with respect to one another in a V-shaped relationship. A source of high pressure air, such as compressed air or the like, or other suspending gas which may be discharged under pressure is connected to the conduits 17 and 19, and by discharge through the openings in the wing tipped discharge nozzle a trough-shaped path or stream of air is provided for suspending the glass beads in space for a short period of time as will more fully appear.

*Production of the Beads*

In the production of the glass beads according to the method of this invention, glass stock is charged through the chute 23 into the glass furnace 11. The furnace is heated to a high temperature which may vary in accordance with the composition of the glass stock, but which should be sufficient to melt the material to a liquid of relatively low viscosity, which is substantially lower than that normally obtained in conventional glass manufacture, such as the manufacture of soda lime or bottle glass. The charging may be carried out continuously in a metered fashion to cause the liquid glass to overflow the weir plate 25 and over the weir spout 27. It is, however, obvious that various means of control for metering the liquid and supplying it in a free falling stream may be employed where desired.

When the glass stock is heated to the high temperature in the glass furnace required to convert the liquid to a low viscosity, the overflowing liquid will drop in a free falling stream 59 through the opening 29 in the bottom of the glass furnace. The viscosity of this liquid should be in the general neighborhood of somewhat less than 10 SAE weight motor oil at room temperature up to about 20 SAE weight motor oil. It will be understood that the higher the viscosity in general the larger are the glass beads that are produced.

As the free flowing liquid glass stream 59 falls through the opening in the bottom of the glass furnace, it is contacted by the compressed air blast from the compressed air conduit 15. It will be understood that changing the pressure of the air blast from the compressed air conduit 15 will generally change the size of the beads that are produced. The higher the pressure of compressed air, the smaller the beads, and the lower the pressure of the compressed air, the larger the bead produced. The conduit 15 and the gas burner 13 are directed at an angle against the free falling stream just beneath the opening in the furnace, and by the alignment of the conduit and the gas burner 13 in a position directed slightly above the horizontal and the molten glass is broken up and dispersed into droplets. The initial path of the dispersion, indicated by the reference numeral 61, is slightly inclined upwardly from the horizontal to extend the period of flight in space. The blast of air in contacting the stream causes the dispersion of the stream into glass droplets of molten glass, which sets rapidly into spherical glass beads. The general path of the glass beads, after the initial path, is indicated by the reference numeral 63, where it is seen that the beads are blown slightly upwardly and then descend in an arc onto a collecting area such as a floor space or into a collecting hopper. A substantial free fall in space of the beads is provided through the positioning of the compressed air conduit 15 at the aforementioned angle and at a substantial distance off the ground. This provides for a substantial time in space, particularly when taken into conjunction with the suspending air tubes 17 and 19. Other types of suspending means such as blowers and fans may also be employed below the compressed air conduits 17 and 19 as will be readily understood.

The gas burner 13 provides a gas flame through the gas and air mixture which is discharged through the opening 43 in the burner nozzle. The ignition of the gas and air mixture provides the flame which completely envelopes and uniformly surrounds the compressed air conduit 15 and the resultant air blast emanating from the mouth of the conduit. The uniform flame is in the form of an annulus or ring provided by the construction of this invention and ensures uniformity of the flame that cannot be established by a plurality of separate burners positioned at the periphery of the air blast. The flame is thrown from the mouth of the burner nozzle a substantial distance well beyond the point of impact of the compressed air with the free falling stream, and thus the flame follows the dispersion droplets and completely envelopes them for a substantial distance during the initial path 61. By completely enveloping the dispersed droplets in the gas and air combustion flame and maintaining the initial path at a very high temperature to provide for keeping the droplets in the molten state, any tear-shaped beads and fibers that are tended to be formed are very substantially minimized. Also, any tear-shaped droplets or fibers that may be formed may be remelted to droplets that can ultimately set to spherical beads. The pilot openings in the burner nozzle also act very efficaciously in combination with the compressed air conduit to keep the flame ignited even in spite of the compressed air blast, which might otherwise have a tendency to cause blow-out of the flame.

The suspension air conduits 17 and 19 are aligned generally parallel to the compressed air conduit 15 and positioned underneath it. By the V-shaped arrangement of the wing tipped discharge nozzles of the air suspension conduits, a V-shaped trough of suspension air is provided directly underneath the dispersion path 61. This high pressure suspension air acts as a suspending air trough, and tends to carry the beads further into space and for a longer period of time. This permits a greater setting time which favors setting and insures that the beads do not hit a hard surface in a semi-solid state before setting, which would tend to damage them and cause malformations. Further, by the arrangement of the V-shaped trough underneath the initial path, cooling of the beads is prevented until the period of time when they are ready to be set at a further period along the dispersion path 63 and after the gas burner flame has performed its part in the operation of remelting and tear-shaped droplets and burning off any fibers that might have been formed initially.

The glass beads after formation and collection upon the floor or collecting hopper are gathered in conventional manner, classified according to size, and may either be used directly in a desired application for reflective coatings or other usages. Any glass which is not dispersed by the compressed air blast may be collected in the tank 35 and recycled to the glass furnace.

The method of this invention has been found to be very effective in the production of glass beads. The formation of glass wool and malformed or non-round glass beads is substantially eliminated through the use of the enveloping gas flame surrounding the compressed air blast. The method of use of the entire apparatus is extremely simple in nature and is relatively uncomplicated. Further, the space limitations are not demanding and the high head room of conventional glass bead furnaces has been obviated. The method of the invention is employed by relatively unskilled workmen to produce glass beads of varying particle size with a high degree of quality and size control.

Various changes and modification may be made in this invention as will be apparent to those skilled in the art. Such changes and modifications are within the scope and teaching of this invention as defined by the claims appended hereto.

What is claimed is:

1. The method of forming glass beads comprising discharging a molten glass stream of relatively low viscosity in a vertically downward direction from a source of supply, establishing a blast of compressed air, circumferentially enveloping said blast with an annular gas flame and directing the air blast with the enveloping gas flame against said stream at an angle thereto and at a force of sufficient magnitude to disperse said stream into a multiplicity of glass droplets, said blast thereafter carrying said droplets through the gas flame and into a cooling space to allow surface tension to shape the droplets to solidified spherical glass beads and collecting the same.

2. The method of forming glass beads comprising discharging a molten glass stream of relatively low viscosity in a vertically downward direction from a source of supply, establishing a blast of compressed air, circumferentially enveloping said blast with a gas flame and directing the air blast with the enveloping gas flame against said stream at an angle thereto and at force of sufficient magnitude to disperse said stream into a multipicity of glass droplets, said blast thereafter carrying said droplets through the gas flame and into a cooling space to allow surface tension to shape the droplets to solidified spherical glass beads and establishing underneath the path of the dispersed droplets a stream of air directed parallel to said blast and having a substantially trough-shaped cross-section to extend the dwell of said droplets in space and collecting them.

3. The method of forming glass beads comprising discharging a molten glass stream of relatively low viscosity in a vertically downward direction from a source of supply, establishing a blast of compressed air, circumferentially enveloping said blast with an annular gas flame and directing the air blast with the enveloping gas flame against said stream at an angle thereto and at a force of sufficient magnitude to disperse said stream into a multiplicity of glass droplets, said blast thereafter carrying said droplets through the gas flame and into a cooling space to allow surface tension to shape the droplets to solidified spherical glass beads and establishing underneath the path of the dispersed droplets and beneath said gas flame a trough-shaped stream of air generally parallel to the path of the compressed air blast to extend the dwell of said droplets in space and set them to glass beads and collecting the same.

References Cited in the file of this patent

UNITED STATES PATENTS

| | | |
|---|---|---|
| 2,460,993 | Brasse et al. | Feb. 8, 1949 |
| 2,554,486 | Austin | May 29, 1951 |
| 2,619,776 | Potters | Dec. 2, 1952 |
| 2,722,718 | Siu | Nov. 8, 1955 |
| 2,947,115 | Wood | Aug. 2, 1960 |
| 2,965,921 | Bland | Dec. 27, 1960 |
| 2,965,922 | Toulmin | Dec. 27, 1960 |